(12) United States Patent
Mahadevan et al.

(10) Patent No.: US 8,799,547 B2
(45) Date of Patent: Aug. 5, 2014

(54) DATA PACKET PROCESSING METHOD FOR A MULTI CORE PROCESSOR

(75) Inventors: Nilakantan Mahadevan, Karnataka (IN); Ananth Yelthimar Shenoy, Karnataka (IN); Srikanth Lakshminarayan, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1129 days.

(21) Appl. No.: 12/668,409

(22) PCT Filed: Jul. 7, 2008

(86) PCT No.: PCT/IN2008/000431
§ 371 (c)(1),
(2), (4) Date: Jun. 2, 2010

(87) PCT Pub. No.: WO2009/008007
PCT Pub. Date: Jan. 15, 2009

(65) Prior Publication Data
US 2010/0241831 A1    Sep. 23, 2010

(30) Foreign Application Priority Data
Jul. 9, 2007    (IN) .......................... 1477/CHE/2007

(51) Int. Cl.
*G06F 13/24*    (2006.01)
(52) U.S. Cl.
USPC .......................................... 710/267; 710/260
(58) Field of Classification Search
USPC ................................................ 710/267, 260
See application file for complete search history.

(56) References Cited

U.S. PATENT DOCUMENTS

| | | | |
|---|---|---|---|
| 6,237,058 B1 | 5/2001 | Nakagawa | |
| 7,043,405 B2 | 5/2006 | Orenstien et al. | |
| 8,190,864 B1 * | 5/2012 | Jordan et al. | 712/244 |
| 2003/0061423 A1 | 3/2003 | Rankin et al. | |
| 2003/0120702 A1 * | 6/2003 | Jahnke | 709/102 |
| 2003/0200250 A1 | 10/2003 | Kiick | |
| 2005/0033889 A1 * | 2/2005 | Hass et al. | 710/260 |
| 2005/0060462 A1 * | 3/2005 | Ota | 710/260 |

(Continued)

OTHER PUBLICATIONS

Tian Tian et al., "Software Techniques for Shared-Cache Multi-Core Systems" http://www.intel.com/cd/ids/developer/asmo-na/eng/recent/286311.htm?page=1.

(Continued)

*Primary Examiner* — Nimesh G Patel

(57) ABSTRACT

A method for processing a data packet in a network server system comprising at least one central processor unit (CPU) having a plurality of cores; and a network interface for forming a connection to a network between the network and a designated CPU core, such that for all data packets received from the network an interrupt is created in the designated CPU core for received data packet processing. Each data packet received from the network is associated with an application connection established in a CPU core selected based on processor load and an interrupt thread is created on the CPU core associated with the application connection for processing the data packet. Each data packet being sent to the network is associated with an application connected established either in the CPU core in which the application is executing or an alternative CPU core selected based on processor load. Where the application connection is established in an alternative CPU core, an interrupt thread is created on the CPU core associated with the connection for processing the data packet.

22 Claims, 6 Drawing Sheets

(56) References Cited

U.S. PATENT DOCUMENTS

2006/0059286 A1   3/2006  Bertone et al.
2007/0180310 A1*  8/2007  Johnson et al. .............. 714/12
2010/0058101 A1*  3/2010  Shahid et al. .............. 713/500

OTHER PUBLICATIONS

"Scalable Networking: Eliminating the Receive Processing Bottleneck—Introducing RSS", Microsoft whitepaper, http://www.microsoft.com/whdc/.

* cited by examiner

DATA PACKET PROCESSING METHOD FOR A MULTI CORE PROCESSOR

RELATED APPLICATIONS

The present application claims the priority under 35 U.S.C. 119(a)-(d) or (f) and under C.F.R. 1.55(a) of previous International Patent Application No. PCT/IN2008/000431, filed Jul. 7, 2008, entitled "Data Packet Processing Method for a Multi Core Processor," which claims priority based on Indian Patent Application No. 1477/CHE/2007, filed Jul. 9, 2007, which application is incorporated herein by reference in its entirety.

BACKGROUND

Known multi core processor platforms comprise one or more central processor units (CPU) which can each have multiple processing cores which share memory and I/O (input and output) resources. The multiple core architecture enables simultaneous execution of processes or "threads" on more than one core. Such multi core processors have been developed to increase platform processing capacity over that of single core processors.

In multi core symmetric multiprocessing processing (SMP) architecture the system memory is shared so any processor core can work on any task regardless of where the data for that task resides in system memory. It is also known for multi core systems to utilise a cache memory shared between multiple cores of the one CPU.

Multi core processor platforms may be used as servers in a network, such as an Ethernet local area network (LAN). Server architecture can comprise a plurality of processors, however, are physically connected to the network using only one LAN interface or network interface card (NIC) connected to one processor core. This network interface can only interrupt one processor core when packets are received from the network. The received packet is then processed through the network stack in the interrupted core until it reaches the application. Thus, the network connected processor core must be used for all data received from the network. In the case of high speed TCP/IP applications or any network stack applications and high bandwidth networks, such as Gigabit and ten Gigabit Ethernet networks, the full server processing capacity may not be realised due to throughput of data between the network and the server being limited by saturation of the network connected processor core.

Current solutions to overcome this problem require the server to be provided with further network interfaces connected to further processors in order to distribute the network interface processing load across multiple processors. This solution can improve throughput between the server and the network, but is inefficient as it requires additional network interface cards. This solution also introduces an additional overhead for coordination of the multiple network interfaces.

Another proposed solution to this problem is to redistribute network stack operations for inbound data to various cores by the network interface. This solution requires interoperability between the LAN or network interface and the processor operating system. Thus, modification of the network interface and operating system is required to implement such a solution, so this solution cannot be implemented with standard currently available network interfaces.

There is a need for server architecture to improve throughput between a network and a server having multi core processor architecture.

BRIEF DESCRIPTION OF THE DRAWINGS

Embodiments of the invention will now be described by way of example only with reference to the accompanying drawings in which.

DETAILED DESCRIPTION

Figure 1:
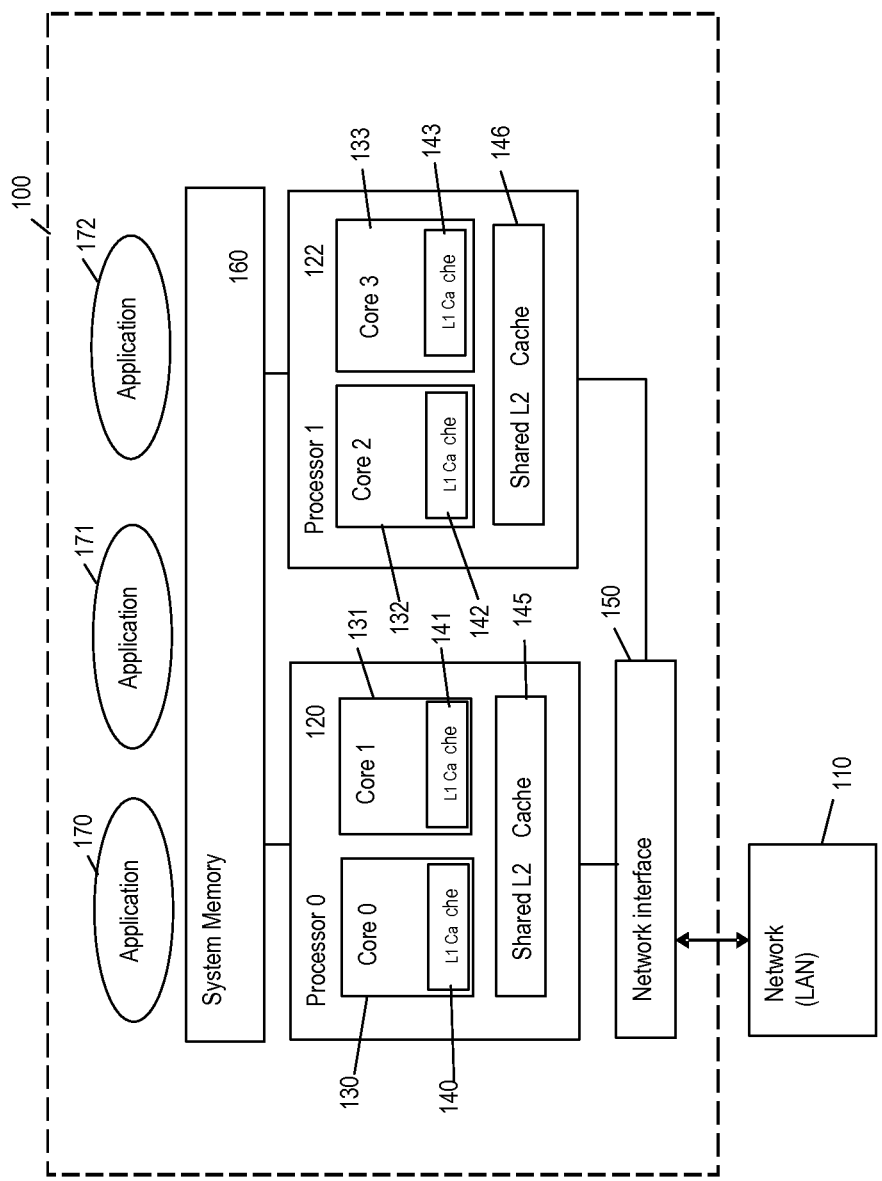
FIG. 1 illustrates an example of a multi core processor architecture.

According to an embodiment there is provided a method of processing a data packet received from a network in a multi core processor platform comprising the steps of:

receiving an interrupt in a designated central processor unit (CPU) core from a network interface for processing a data packet received from the network;

associating the data packet with an application connection established in a central processor unit (CPU) core selected based on processor load; and creating an interrupt thread on the CPU core associated with the application connection for processing the received data packet.

According to an embodiment there is provided a method of processing a data packet being sent to a network by an application executing in one central processor unit (CPU) core of a multi core processor platform, the method comprising the steps of:

determining whether to perform outgoing processing of the data packet using the CPU core executing the application or using an alternative central processor unit (CPU) core;

and where it is determined to use an alternative CPU core:

selecting an alternative CPU core for outgoing packet processing based on processor load;

establishing a application connection in the selected alternative CPU core;

associating the data packet with the application connection; and creating an interrupt thread on selected alternative CPU core for processing the data packet to the network interface for transmission over the network.

According to an embodiment there is provided a network server system comprising at least one central processor unit (CPU) having a plurality of cores and a network interface for connecting to a network, and adapted to create an interrupt in a designated CPU core for processing each data packet received from the network. Each data packet received from the network is associated with an application connection established in a selected CPU core selected based on processor load. An interrupt thread is created on the CPU core associated with the application connection for processing the data packet.

According to an embodiment there is provided a network server system comprising at least one central processor unit (CPU) having a plurality of cores and a network interface for connecting to a network, and adapted to create an interrupt in a designated CPU core for each data packet received from the network, and further adapted such that each CPU core can access the network interface for transmitting data packets to the network. Each data packet being sent to the network is associated with an application connection established either in the CPU core in which the application is executing or an alternative CPU core selected based on processor load. Where the application connection is established in an alternative CPU core, an interrupt thread is created on the CPU core associated with the application connection for processing the data packet.

Embodiments of the present invention provide a method and system for processing packets sent to and received from a network 110 in a multi core processor platform 100 to reduce limitations to throughput of data to and from the network 110 due to the network interface interrupting one CPU core for all received packets. Received packets are associated with an application connection established in a selected central processor unit (CPU) core, wherein the CPU core is selected based on processor load. An interrupt thread is then created on the CPU core associated with the application connection for the received packet. This enables the packet processing to be handed off to a core, other than the network interface interrupted CPU core, in which an application connection exists or is established to reduce the processing capacity being used in the network interface connected core for packet processing.

An example of a network server system for implementing this method is illustrated in FIG. 1. The system 100 includes at least one central processor unit CPU 120 122 each having a plurality of cores 130 131 132 133, optionally the cores 130 131 within one processor 120 have a shared cache 145 as well as each core 130 131 having its own respective cache 140 141. For symmetric multiprocessing (SMP) the system memory 160 is shared such that any processor can access any data in system memory 160. A network interface 150 is provided for forming a connection between the server 100 and the network 110. The network interface 150 is connected to a predetermined CPU core 130 such that an interrupt will be created in the predetermined CPU core 130 for each data packet received from the network. The predetermined CPU core 130 distributes each data packet received from the network to a selected one of the plurality of processor cores 130 131 132 133 based on processor load where the packet is processed until it reaches the destination application 170 171 172.

Advances in high speed networks and interfaces has lead to a situation where the network interface driver is capable of delivering packets to a processor faster than the processor has the capacity to process the packets through the network stack and deliver the data to the destination applications 170 171 172. This is a problem in SMP network architecture where the network interface 150 is programmed to interrupt only one processor core 130 on receipt of a packet and all further processing of that packet occurs on the same core 130 until the data reaches the application. In this situation the CPU core 130 which receives the interrupt from the network interface 150 acts as a bottleneck, limiting the throughput of data to the applications.

Embodiment of the present invention alleviate this problem by relieving the CPU core 130 interrupted by the network interface 150 from packet processing as the packet is received by the network stack and by parallization of network stack operations. Thus the processing of received packets can be distributed to other CPU cores 131 132 133 in order for the network interface core 130 to be freed to receive more data from network interface 150.

Figure 2:
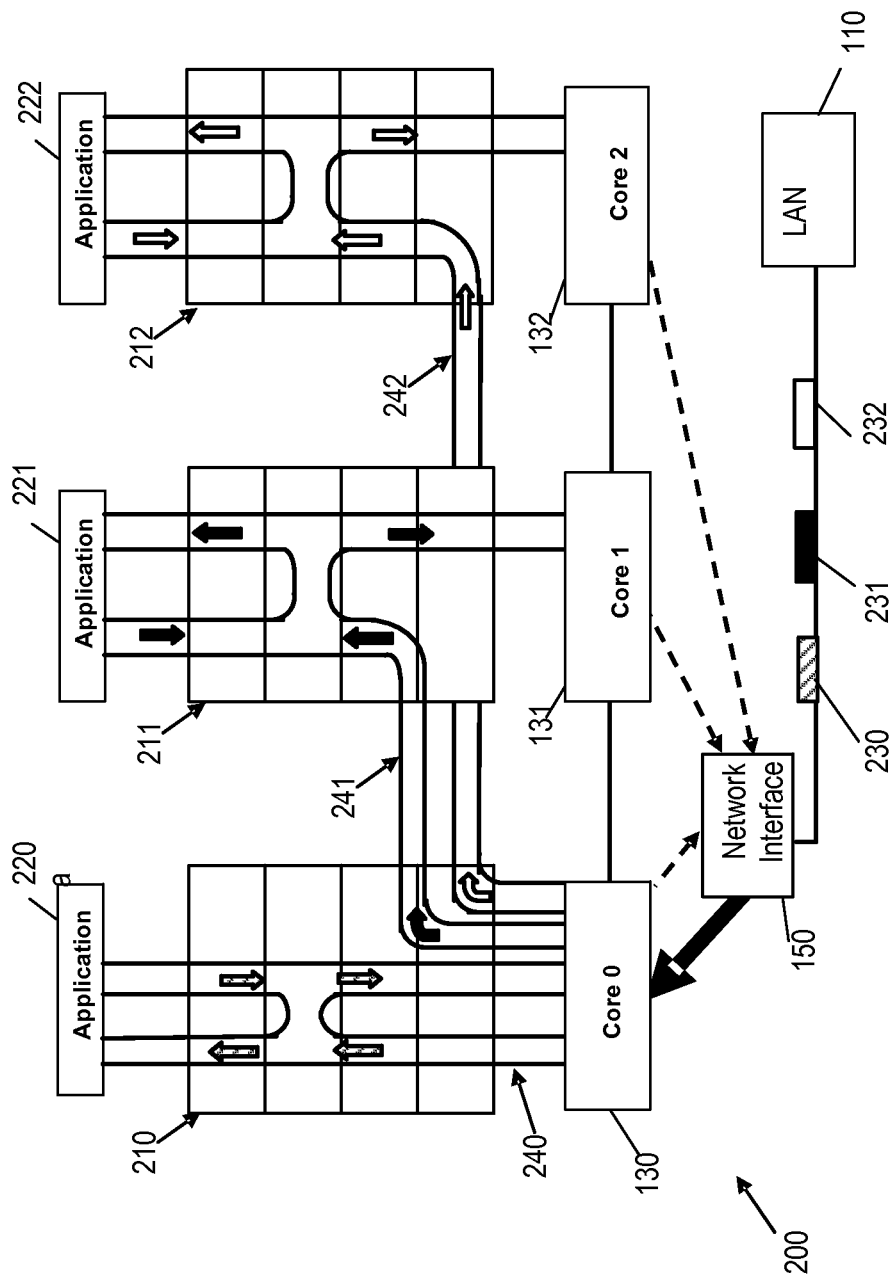
FIG. 2 illustrates an example of processing packets through the network stack of a multi core processor according to an embodiment of the present invention.

The process for distributing each received packet 230 231 232 is illustrated in FIG. 2. Each packet received from the network is initially handled in the network stack 210 of the network interface 150 connected CPU core 130. The received packet is then associated with an application connection 240 241 242 for a destination application 220 221 222 in a selected CPU core 130 131 132. An interrupt is created on the CPU core associated with the application connection for processing the received packet through the network stack 210 211 212 of the respective core 130 131 132.

When each packet is received from the network 110 by the network interface 150, an interrupt is generated to start the processing of the received packet through the network stack 210 of the network interface connected CPU core 130. The packet is associated with an application connection in a selected CPU core and the processing of the packet handed over to the selected CPU core as soon as possible, at the bottom of the network stack, after the packet is received.

Figure 3:
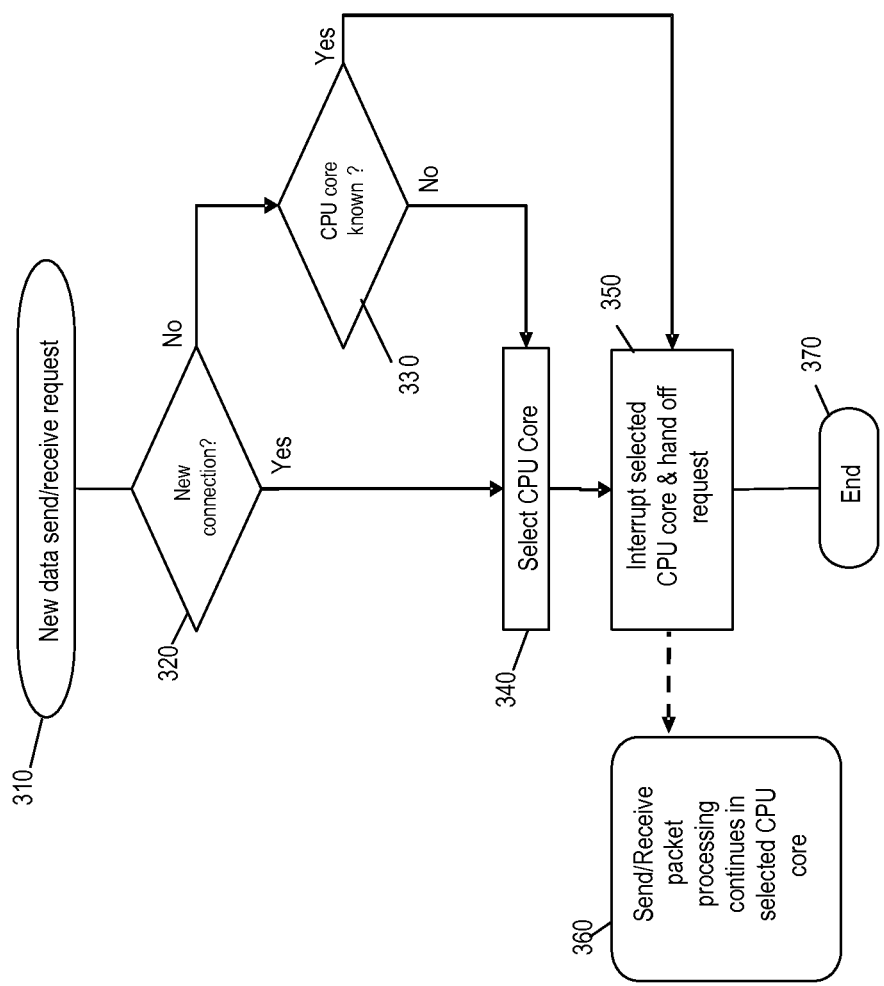
FIG. 3 is a flow chart illustrating a kernel process of selecting a processor core and handing over packet processing to the selected core.

The process of associating a packet with an application in a selected CPU core and handing over packet processing is illustrated in the flowchart of FIG. 3. For example, the process of FIG. 3 is executed for data transmission, data reception, a new outgoing connection request or a new incoming connection request, however, the processing occurs at different levels in the network stack depending whether the an incoming or outgoing request is being processed. For incoming requests this process occurs at the bottom of the network stack for example in the data link layer or a layer just above, whereas for outgoing requests this process occurs at the top of the network stack for example in the session layer. The incoming or outgoing request 310 is received in the relevant layer of the network stack, it is then determined whether a new application connection is required 320 for the request.

Where a connection already exists, and the CPU core for the connection is known 330 then this known CPU is interrupted 350 and the processing handed over to this CPU core, such that a packet is associated with the connection and all further processing continues using this connection in the interrupted CPU core 360.

Applications connections may exist and can be handled in more than one core and in this situation the preferred CPU core for processing of data packets may not be known 330. If the preferred CPU core is not known then a CPU core is selected 340, from those where an application connection is established, based on the processor load and other preferred criteria. For example, for a send request it is preferable to establish the application connection in the CPU core being used for the application execution. If a preferred CPU core is not known, then a CPU core can be selected 340 based on processor load alone. An interrupt to associate data processing with the connection in the selected core is then created 350 and processing continues 360 in the selected core.

Where no connection is already established 320, for example for an outgoing request for a new connection, a CPU core for the connection is selected 340 based on processor load. An interrupt is then created 350 to establish the connection in the selected core and associate data processing with this connection then processing continues 360 in the selected core.

Once the selected core has been interrupted and processing handed over to this core in accordance with the established connection 360, then the processing of the incoming or outgoing request is completed 370 for the original core, which frees the original core to continue processing the next operation.

In a preferred embodiment a separate interrupt thread is created for each outgoing or incoming request for a connection. In this embodiment a processor core per connection technique is adopted and once the received packet is associated with the connection all further work is done by the software interrupt thread that is created on the selected CPU core for that incoming or outgoing request. This interrupt thread will do all further processing on the received or transmitted data until it reaches application or is transmitted to the network. The interrupt thread is utilized as early as possible so as to free up the network interface connected CPU core during an incoming request.

In the case of received packets, selection of a processor core for a connection occurs at the bottom of the network stack, for example in the data link layer or a layer just above during the connection establishment. The core is selected based on load, however preference can be given to select the core on which the destination application for the packet is running This can provide advantages by minimising future interrupts and network stack processing handoffs, for example for data transmission and improve cache utilisation or minimise cache misses. Further, in a preferred embodiment affinity of the application is set with the selected core so that application is not rescheduled on another core.

A further advantage of the above method is minimisation of locking and associated wasted CPU cycles waiting for a lock. Where data is transmitted over the network by the application in conventional server architecture, the network stack has to acquire a spin lock in order to synchronize access to data structures and avoid contention between processing of incoming and outgoing packets. This can result in wasted CPU cycles spinning while waiting to acquire the lock.

Embodiment of the present invention alleviates this problem by relieving the CPU core 130 interrupted by the network interface 150 from packet processing as the packet is received by the network stack and by parallization of network stack operations. Thus the processing of received packets can be distributed to other CPU cores 131 132 133 in order for the network interface core 130 to be freed to receive more data from network interface 150.

Variations in the core selection process and algorithm may be made depending on the server architecture. For example, in a hyper threading environment, a plurality of co-threads may be established for parallel processing though each CPU core, appearing as each co-thread being executed in a separate virtual CPU emulated in the CPU core. In this example, an embodiment can be implemented where the possibility of CPU contention by co-threads is minimised by keeping the co-thread CPU core free as much as possible. In this embodiment, during connection establishment a core other than the co-thread CPU core is preferentially selected.

Alternatively, in an embodiment suitable for architectures having a cache shared between partner cores, a partner core can be selected to leverage the benefits of the shared cache. For example, where the cache is shared then by handing off the received packet processing, as described above, to the partner core can minimise cache updates.

The selection of the processor core can be implemented using an algorithm integrated with the operating system (OS) scheduler to select the processor core based on software interrupt load on all CPU cores. As the number of network connections increases, thus it is desirable to evenly distribute stack processing across all the available processors cores.

The operating system schedules processes but does not schedule software interrupts. In an embodiment a software interrupt load detection algorithm is used to evenly distribute the load by identifying the CPU core with the least software interrupt load which is coupled with an OS scheduler and is used by the network stack to select a CPU core in which to establish a connection. The established connection is maintained on one CPU core or is migrated to a different CPU as the interrupt load changes. Thus, the total load is distributed among the plurality of cores enabling more data to be processed.

The decision of selecting a particular core for a connection depends on the least heavily loaded CPU core, which can also be identified as the CPU which spends the least amount of time in and above the software interrupt at which network stack is executed. An example of a mathematical model which can be used to find the optimal CPU core for each connection is described below.

The time spent at and above the software interrupt priority level (IPL) in which the network stack executes for sample n is represented as $\partial_n$.

$\Delta \partial_n$ represents the total time spent by the CPU core at and above software IPL during the time interval between n and n−1.

$$\Delta \partial_n = \partial_n - \partial_{n-1} \quad [1]$$

The average of the $\Delta \partial$ over a period of time is represented as $\lambda$ i.e. it is the average time the CPU core has spent in the required software IPL and above over a period of time.

$$\lambda avg_n cpu_x = \frac{\Delta \partial_n + \lambda avg_{n-1} cpu_x * (n-1)}{N} \quad [2]$$

The next kernel job will be triggered on $cpu_x$ with the lowest $\lambda avg_n cpu_x$. This means that next kernel job, to establish an application connection, is triggered on a CPU core which has spent the least amount of time on and above the software interrupt at which network stack is executed.

The deviation of the average time for each CPU core from the previous value is represented as $\Gamma cpu_x$ where $$[\lambda avg_n cpu_x - \lambda avg_{n-1} cpu_x]^2 < \Gamma cpu_x \quad [3]$$

This represents the deviation from the previous calculation. In order to minimize the overhead an embodiment uses deviation as a measure to decide whether the CPUs average is recalculated during the next sampling period. If the previous difference in $\lambda$ is less than a threshold $\Gamma$, then the average calculation for that CPU is not done for twice the previous time interval $$\sigma_{cpux} = 2 * \sigma_{cpux} \quad [4]$$

where $\sigma_{cpux}$ is the sampling frequency for CPUx.

Further, the total number of processors can be divided into an equal number of partitions and for each sample one of the set can be used for the average calculation. The $\lambda avg_n cpu_x$ is maintained in a sorted array representing the average interrupt load value for each CPU and is accessible for use by the network stack to determine the optimal CPU for a particular connection.

EXAMPLE 1

Figure 4:
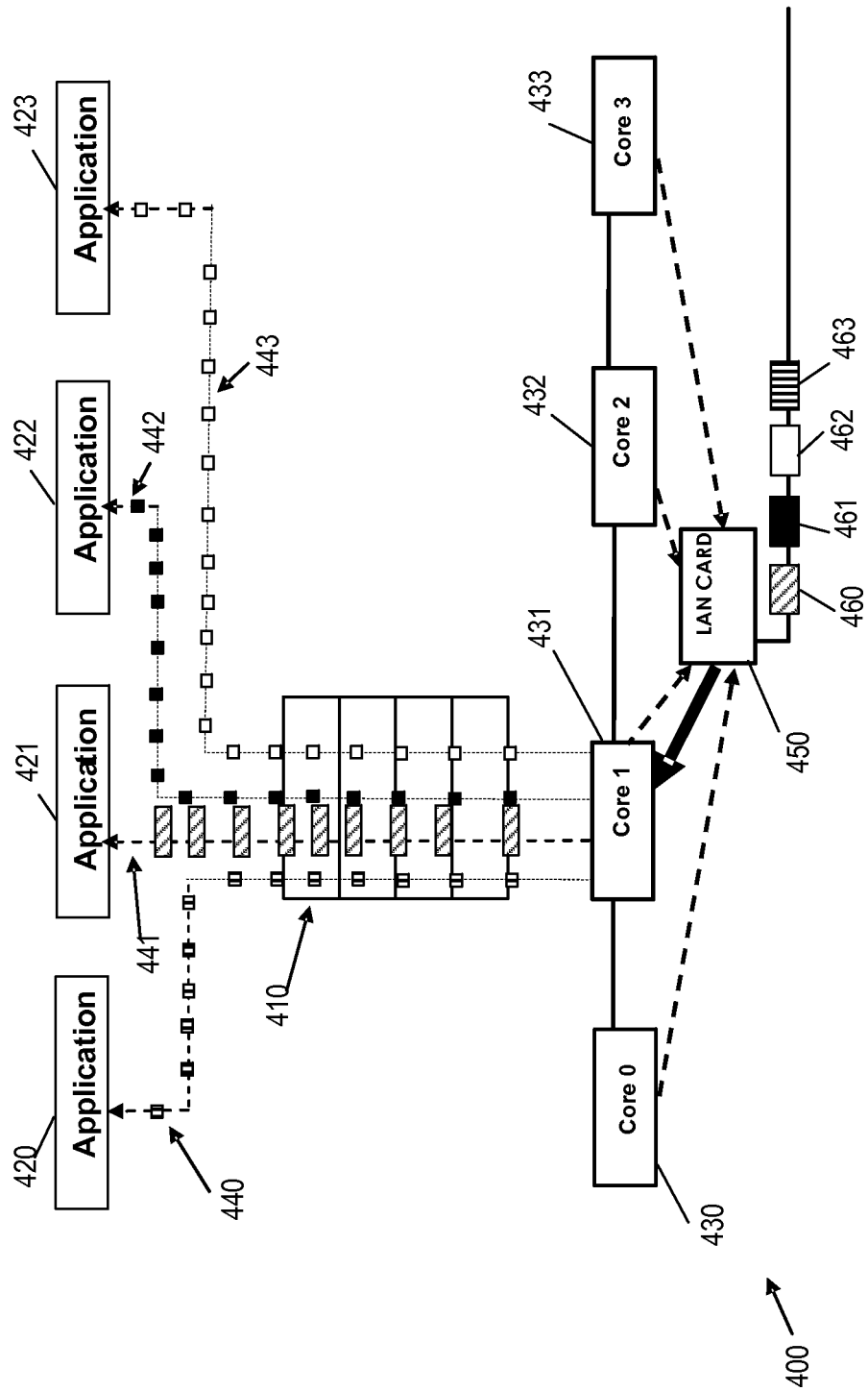
FIG. 4 illustrates a conventional multi core processor network stack architecture test model used in comparative test Example 1.
Figure 5:
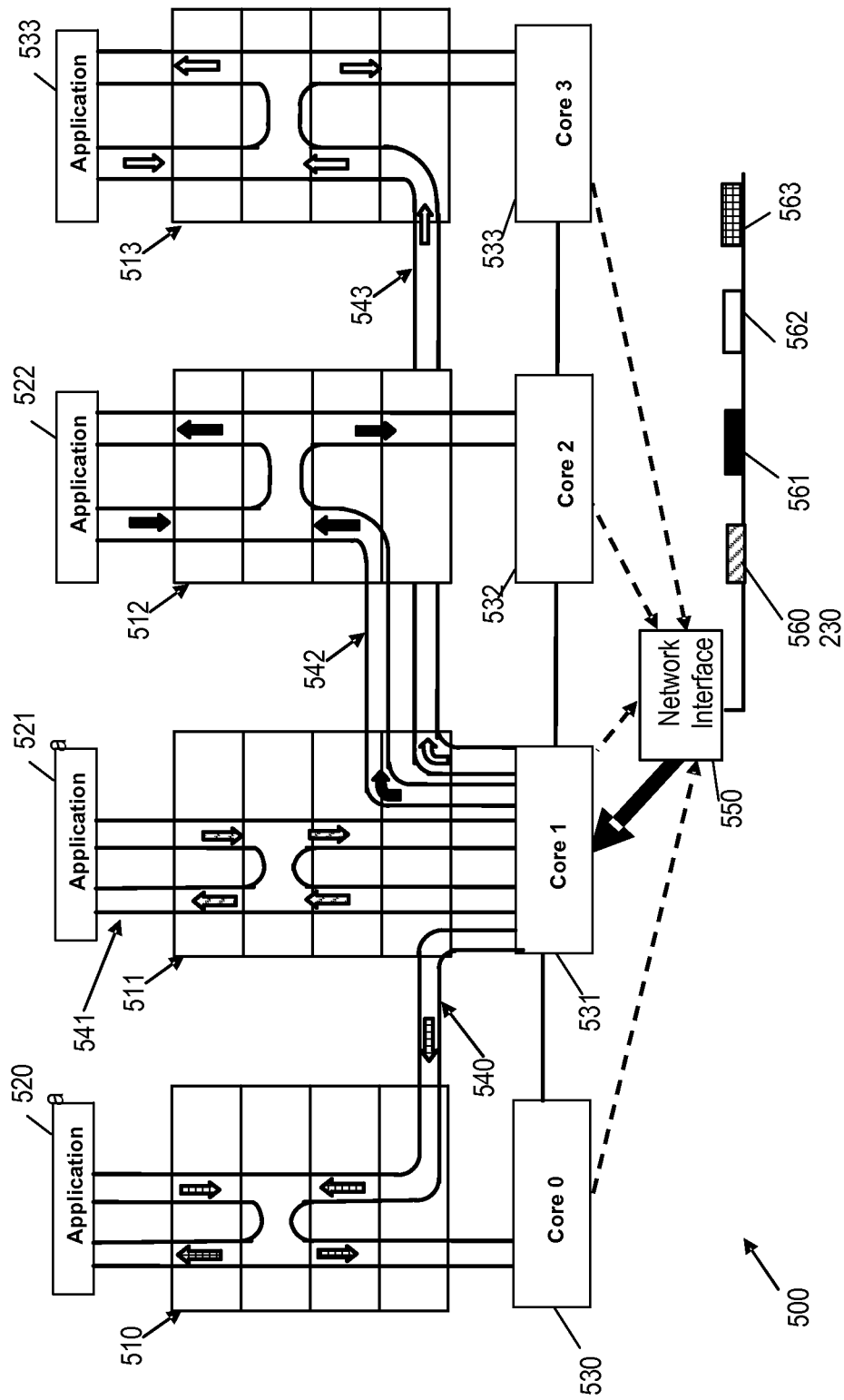
FIG. 5 illustrates a multi core processor network stack architecture in accordance with an embodiment of the present invention used in comparative test Example 1.

This example uses the results of proof of concept testing which compares the performance of an embodiment of the present invention implemented as a test model using SMP architecture as illustrated in FIG. 5 with a test model implemented using conventional multi core server architecture comprising three CPU cores 430 431 432 433 as illustrated in FIG. 4.

In the conventional SMP server architecture of FIG. 4, all received packets 460-463 are processed through the network stack 410 of the LAN card 450 connected core 431, whereas sent packets (not shown) are processed through the respective network stack of the core 430 431 432 433 on which the application 420 421 422 423 is executing, requiring spin locking In the server of FIG. 4 received packets 460 461 462 463 are sequentially processed 440 441 442 443 through the network stack 410 of the LAN connected CPU core 431 until they reach their respective destination applications 420 421 422 423 and the data is used by the application on the core in which it is scheduled.

In the proof of concept distributed stack architecture of FIG. 5, received packets 560-563 are associated with respective connections 540 541 542 543 and processing handed off, where necessary, from network stack 511 in the network interface 550 connected core 531 to the respective network stacks 510 511 512 513 for processing until reaching the respective destination application 520 521 522 523. Sent packets are associated with the application connections 540 541 542 543 and processed through the respective network stack 510 511 512 513 of the respective CPU core 530 531 532 533 and are sent via the network interface 550.

Table 1 provides experimental results for the distributed network stack of FIG. 2 compared with that of FIG. 4.

TABLE 1

Effective distribution of software interrupts among all CPUs, Spin wait and CPU utilization

| Stack | CPU Spinwait % | % Spinwait in Transport layer | Average Throughput % | system utlization % | Total Interrupt Event/Sec | CPU 0 (IPL event) | CPU 1 LAN CPU IPL event | CPU 2 IPL events | CPU 3 IPL events |
|---|---|---|---|---|---|---|---|---|---|
| Conventional Stack | 33 | 40 | 43 | 15 | 1162 | 36.4 | 1121 | .1 | 5.3 |
| Distrbuted network stack | 23 | 0 | 46 | 17 | 1457 | 105 | 1146 | 106 | 100 |

As can be appreciated by a person skilled in the relevant art the distributed stack architecture of FIG. 5 achieves concurrency in the transport layer by placing a connection in each CPU core 530-533. The network interface connected CPU core 531 is relieved from packet processing, as is demonstrated by the results of Table 1 by distribution of the interrupts among all CPU cores 530-531. The results show a 10% reduction in CPU spin wait state.

Figure 6:
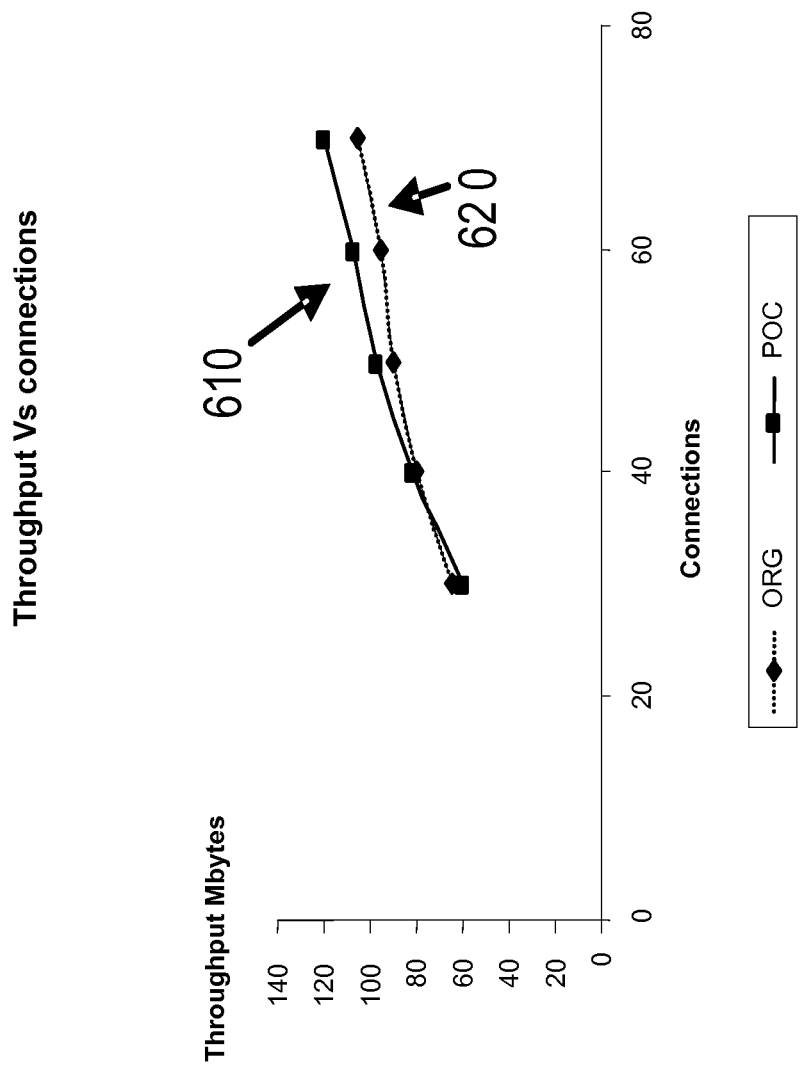
FIG. 6 is a graph illustrating the results of comparative test Example 1.

The throughput achieved for the distributed stack architecture is at least comparable to the conventional network stack architecture and, as illustrated in FIG. 6, the distributed stack architecture 610 starts performing better than the conventional architecture 620 as the number of connections and data volume increases.

The CPU utilization of the distributed stack architecture is marginally higher than that of the conventional architecture due to overhead involved in creating the interrupt thread in the CPU associated with each connection. The distributed stack architecture test model foreshadows more potential once concurrency is achieved in all layers.

The invention claimed is:

1. A method of processing a data packet comprising:
receiving an interrupt in a designated central processor unit (CPU) core within a multi core processor platform from a network interface for processing the data packet received from the network;
associating the data packet with an application connection established in a central processor unit (CPU) core selected based on processor load;
creating an interrupt thread on the CPU core associated with the application connection for processing the received data packet; and
selecting the CPU core in which to establish the application connection; and
establishing the application connection in the selected CPU core;
in which the steps of selecting a CPU core and establishing a connection are performed at session layer level of a network stack.

2. The method of claim 1 in which the CPU core is selected based on processor interrupt load for each CPU core.

3. The method of claim 2 in which the CPU core is selected giving preference to a CPU core sharing cache memory with a CPU core performing an operation related to the received packet.

4. The method of claim 2 in which the multi core processor is adapted to enable hyper-threading and in which a virtual CPU for establishing the application connection is selected in the CPU core selected giving preference to a non co-threaded CPU core.

5. The method of claim 2 in which the processor interrupt load is monitored by an operating system scheduling function.

6. The method of claim 1 further comprising the step of associating affinity for the application with the selected CPU core.

7. A method of processing a data packet comprising:
determining whether to process an outgoing data packet using a CPU core within a multi core processor platform executing an application or using an alternative central processor unit (CPU) core; and
where it is determined to use the alternative CPU core:
selecting the alternative CPU core for outgoing packet processing based on processor load;
establishing an application connection in the selected alternative CPU core;
associating the data packet with the application connection; and creating an interrupt thread on the selected alternative CPU core for processing the data packet to the network interface;

in which the steps of selecting the alternative CPU core and establishing an application connection are performed at session layer level of a network stack.

8. The method of claim 7 in which the CPU core is selected based on processor interrupt load for each CPU core.

9. The method of claim 8 in which the CPU core is selected giving preference to a CPU core sharing cache memory with a CPU core performing an operation related to the data packet.

10. The method of claim 8 in which the multi core processor is adapted to enable hyper-threading and in which a virtual CPU for establishing the application connection is selected in the CPU core selected giving preference to a non co-threaded CPU core.

11. The method of claim 8 in which the processor interrupt load is monitored by an operating system scheduling function.

12. A network server system comprising:
at least one central processor unit (CPU) having a number of cores; and
a network interface for connecting to a network,
in which the network interface is adapted to create an interrupt in a designated CPU core for processing each data packet received from the network, and in which:
each data packet received from the network is associated with an application connection established in a selected CPU core at session layer level of a network stack;
the CPU core is selected based on processor load; and
an interrupt thread is created on the CPU core associated with the application connection for processing the data packet.

13. The network server system of claim 12 in which the CPU core is selected based on processor interrupt load for each CPU core.

14. The network server system of claim 13 in which the CPU core is selected giving preference to a CPU core sharing cache memory with a CPU core performing an operation related to the received packet.

15. The network server system of claim 13 in which the processor interrupt load for each CPU core is monitored by a operating system scheduler function.

16. The network server system of claim 13 in which the multi core processor is adapted to enable hyper-threading and in which a virtual CPU for establishing the application connection is selected in the CPU core selected giving preference to a non co-threaded CPU core.

17. The network server system of claim 12 in which, for data packets received from the network" the processor is adapted to select a CPU core and establish the application connection at data link layer level of a network stack.

18. A network server system comprising:
a number of central processor units (CPU) each having a plurality of cores; and
a network interface configured to connect to a network and further configured to allow each CPU core to access the network, in which:
the network interface is adapted to create an interrupt in a designated CPU core for processing each data packet received from the network, and in which:
each data packet being sent to the network is associated with an application connection established either in the CPU core in which the application is executing, or an alternative CPU core selected based on processor load; and,
where the application connection is established in an alternative CPU core, an interrupt thread is created on the CPU core associated with the application connection for processing the data packet;
in which, for data packets being sent to the network, the processor is adapted to select a CPU core and establish the application connection at session layer level of a network stack.

19. The network server system of claim 18 in which the CPU core is selected based on processor interrupt load for each CPU core.

20. The network server system of claim 19 in which the CPU core is selected giving preference to a CPU core sharing cache memory with a CPU core performing an operation related to the received packet.

21. The network server system of claim 19 in which the processor interrupt load for each CPU core is monitored by a operating system scheduler function.

22. The network server system of claim 19 in which the multi core processor is adapted to enable hyper-threading and in which a virtual CPU for establishing the application connection is selected in a CPU core selected giving preference to a non co-threaded CPU core.

* * * * *

UNITED STATES PATENT AND TRADEMARK OFFICE
CERTIFICATE OF CORRECTION

PATENT NO. : 8,799,547 B2
APPLICATION NO. : 12/668409
DATED : August 5, 2014
INVENTOR(S) : Nilakantan Mahadevan et al.

It is certified that error appears in the above-identified patent and that said Letters Patent is hereby corrected as shown below:

In the Specification

In column 5, line 41, delete "parallization" and insert -- parallelization --, therefor.

In the Claims

In column 10, line 4, in Claim 17, delete "network"" and insert -- network, --, therefor.

Signed and Sealed this
Eleventh Day of November, 2014

Michelle K. Lee
*Deputy Director of the United States Patent and Trademark Office*